Dec. 18, 1956   J. F. DAINO   2,774,316
METHOD FOR BAKING PIZZA PIE
Filed Dec. 29, 1953
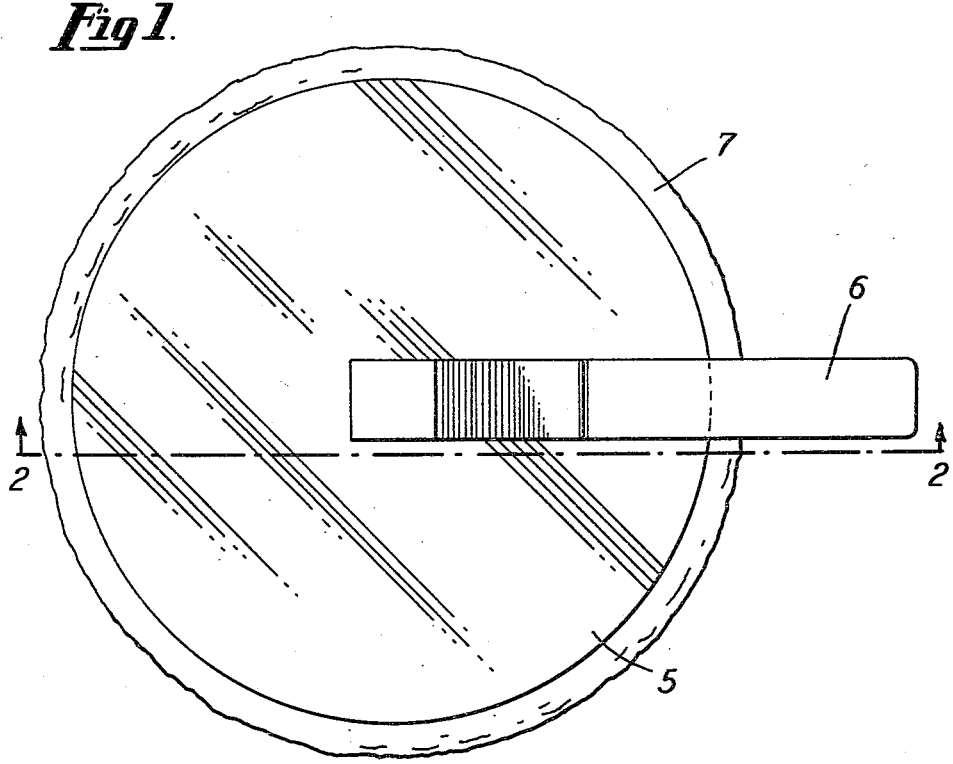
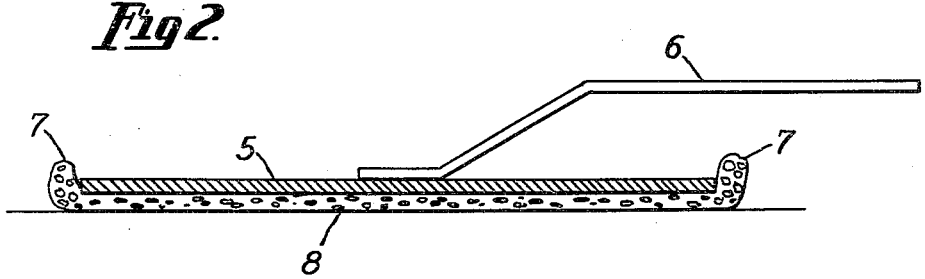
INVENTOR.
JOSEPH F. DAINO

United States Patent Office 2,774,316
Patented Dec. 18, 1956

2,774,316

METHOD FOR BAKING PIZZA PIE

Joseph F. Daino, Ithaca, N. Y.

Application December 29, 1953, Serial No. 400,891

1 Claim. (Cl. 107—54)

This invention relates to the manufacture of pizza, a type of leavened pastry popular in Italy and America, usually consisting of a sheet of dough, baked with a covering of tomato sauce, cheese, seasoning and oil. As it is a relatively thin, flat sheet of dough in which the yeast has already worked, only a few minutes are required for the baking, and it is usually served hot. This simple, old-world dish presents certain difficulties in any restaurant where a considerable number of patrons all want their pizza at substantially the same time. As ordinarily made, it requires a specially trained cook with certain manual dexterity, who is rushed for awhile and has nothing to do for the rest of the day. When made in the traditional way, the dough can be mixed and proofed in advance, with the risen dough kept in a cooler; but it is not practical to form, fill and bake in advance, since the filling would lose its freshness. The filling has also affected the baking of the center of the dough as distinguished from the rim. Under such conditions most small restaurants cannot afford a pizza cook.

The present invention solves the problem to some extent by making possible the advance partial cooking of the sheets of dough in their traditional form, including a naturally risen rim, so that the dish can be mostly prepared in advance and handled during the rush as a brown-and-serve item. It also makes possible the packaging and sale of pizzas for home cooking as a brown-and-serve item, so that the average housewife can cook and serve it as a family dish. The formed dough is rather tough, particularly before the final browning, so that it will stand handling and shipment, while the ingredients for the filling can be included in sealed plastic bags. The housewife has merely to spread them on the pastry, heat to brown the dough, and serve. With the present invention the process is even quicker in a restaurant, where the raw filling is available in quantity.

The key to the process is to control the rising and baking of the center of the sheet (which in the old process was covered by the filling) while leaving the rim free to rise in an uncontrolled manner to produce the characteristic form of the traditional dish. Fixed forms such as sometimes used for pie crusts and shells are too rigid, and give an objectionable machine-like uniformity. The present invention uses a free floating plate which is of such weight and heat transmitting capacity as to attain the result desired.

Referring now to the drawings forming part of this specification,

Fig. 1 is a plan view of the control plate as laid on a round sheet of pizza dough in the process of baking.

Fig. 2 is a cross-sectional view taken on the line 2—2 of Fig. 1 during baking but before the central control plate is removed.

Similar reference numerals refer to similar parts thruout the various views.

Referring now to Fig. 1 and Fig. 2, the control plate 5 is a flat disk provided with a handle 6 welded or otherwise secured thereto. This handle 6 is also preferably made of flat material bent as shown, and for clarity is not shown in cross-section in Fig. 2, the section line 2—2 of Fig. 1 being taken a little off center. The control plate 5 is usually a smooth circular disk of aluminum or other suitable material, about a sixteenth inch thick and say ten or twelve inches in diameter or larger, depending on the size of the pizza to be made. The general shape of the plate 5 depends on the shape of pizza desired, which is generally round as shown. They can also be made rectangular, triangular or hexagonal if desired, in which case the control plate would be that shape, though always enough smaller than the pizza to leave an uncovered border of dough for the pizza rim 7.

This rim 7 is characteristic of a high grade pizza, as distinguished from some cheaper commercial types which are quite flat like a pancake. Neither is it molded or shaped by a form as in an ordinary pie pan. On the contrary, the rim 7 under the present invention rises freely in the baking, for the reason that the control plate 5 does not extend over the rim to restrain or compress it. On the other hand, the control plate 5 does modify and to some degree compress the dough under it in the central or inner part 8 of the pizza where the filling will ultimately be placed. The effect of the control plate 5 lying on the dough when the baking occurs involves several phenomena. In the first place, the weight tends to compress the bubbles of $CO_2$ which permeate the dough as a result of the proofing. Secondly, the escape of superficial bubbles directly under the plate is retarded; and finally the contact of the dough with a good heat conductor such as the plate 5 gives a harder texture to the upper skin of the dough. These all tend to produce a high quality pizza with a texture that adds to the palatability and makes the ultimate dish less soggy in the center when the filling is added in the final (second) baking.

The use of such a control plate 5 over the central part 8 of the pizza, leaving the rim 7 free, saves the manual labor heretofore required in forming a good rim in the manner desired for a good pizza. Accordingly, by using the improved method, the time previously consumed in preparing the dough parts can be greatly reduced, and they can be baked to a preliminary definite form without the filling and stored so as to be ready for the demand when it comes. Then when called for the filling can be quickly added, a second quick bake will cook the filling and delicately brown the crust, so that the pizza when served has all of the desirable characteristics of a traditional pizza—and if anything is somewhat better due to the fact that the part of the crust cooked under the control plate 5 is not so soggy.

The use of such a control plate having a diameter smaller than the pizza so as to leave an exposed rim is feasible in the mechanical baking machines of large bakeries as well as being adaptable to the more manual type of oven in restaurants.

While I have in the foregoing described a certain specific form by way of example, it will be understood that it is merely for the purpose of illustration to make clear the principles of the invention, which is not limited to the particular form shown but is susceptible to various modifications and adaptations in different installations as will be apparent to those skilled in the art without departing from the scope of the invention as stated in the following claim.

I claim:

The method of preparing a pizza shell which consists in taking a flat proofed sheet of pizza dough of the general peripheral contour desired and placing on its central area a flat control plate of heat conducting material having a similar peripheral contour but of sufficiently smaller diameter to leave an upwardly exposed border around the rim of the dough, the dough is then given a preliminary baking during which it is restrained from rising in its central area by the downward pressure of the inherent weight of said control plate applied thereover with the effect that a shallow pizza shell is formed due to the greater vertical rise of the unrestrained rim portion, the preliminary baking being terminated after the pizza shell is definitely formed in its final contour but before it is finally browned, whereby a fully formed pizza shell may be manufactured as a brown-and-serve dish.

References Cited in the file of this patent

UNITED STATES PATENTS

| | | |
|---|---|---|
| 898,478 | Jackson | Sept. 15, 1908 |
| 987,525 | Wing | Mar. 21, 1911 |
| 2,111,021 | Bemis | Mar. 15, 1938 |
| 2,411,345 | Suttles | Nov. 19, 1946 |
| 2,411,857 | Harriss | Dec. 3, 1946 |
| 2,508,724 | Moffett | May 23, 1950 |
| 2,513,839 | Barnes | July 4, 1950 |
| 2,549,595 | Gregor | Apr. 17, 1951 |
| 2,668,117 | Bucci | Feb. 2, 1954 |